No. 32,756. PATENTED JULY 9, 1861.
J. A. DE MANIQUET.
WINDING, DOUBLING, TWISTING, AND SPINNING SILK, &c.
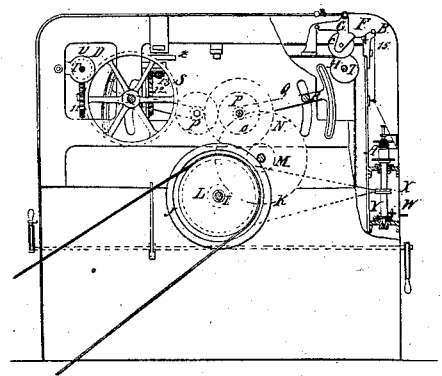
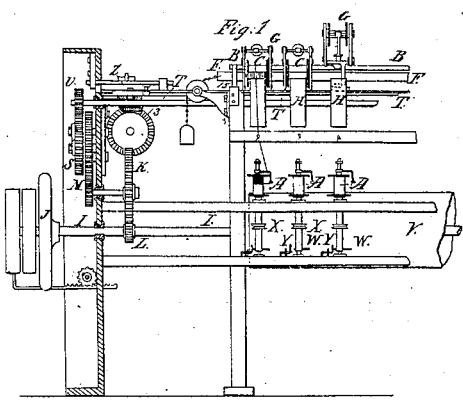
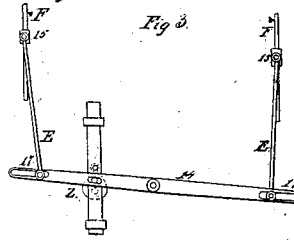
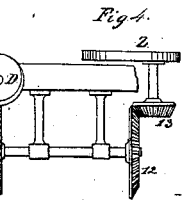
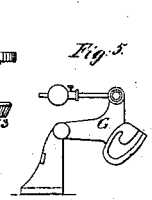
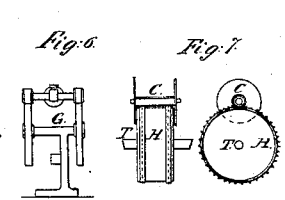
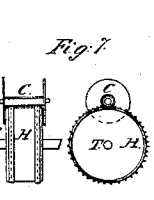
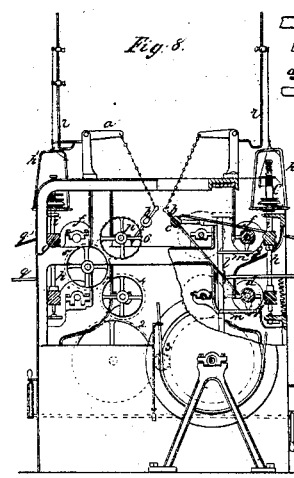
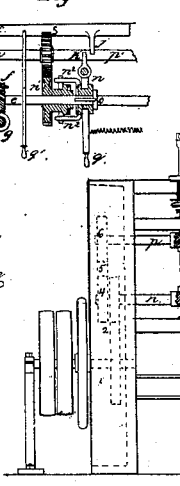
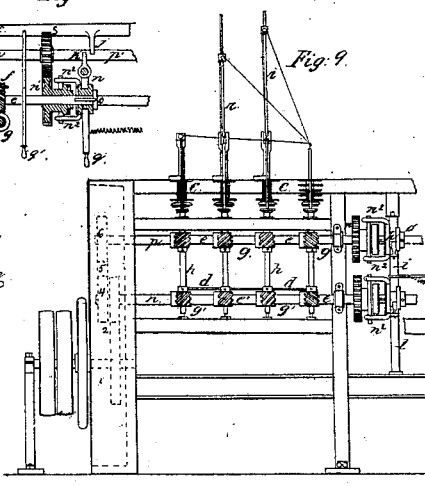
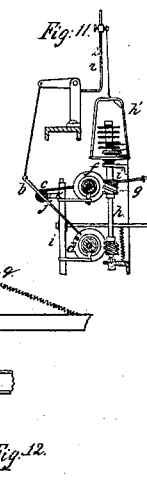
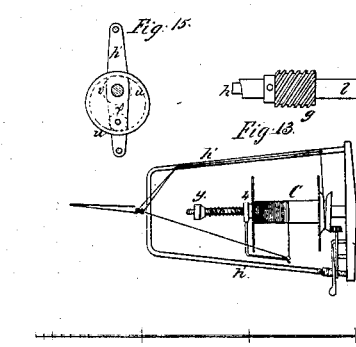
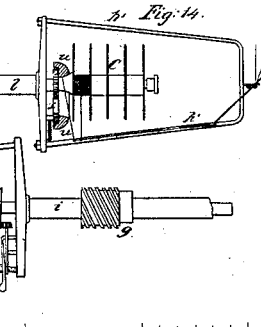
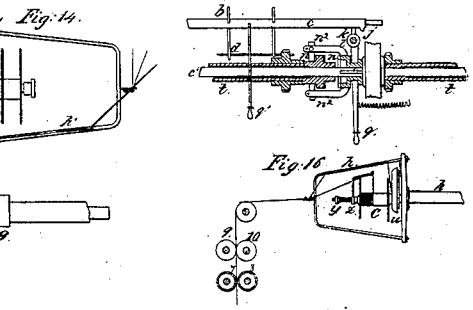
Witnesses:
Edwin Evans
Thomas C. Smith
Inventor:
J. A. de Maniquet by
J. W. Mak his atty
THE NORRIS PETERS CO., PHOTO-LITHO., WASHINGTON, D. C.

UNITED STATES PATENT OFFICE.

J. A. DE MANIQUET, OF PARIS, FRANCE.

MACHINE FOR TWISTING SILK.

Specification of Letters Patent No. 32,756, dated July 9, 1861.

*To all whom it may concern:*

Be it known that I, JEAN ANTOINE DE MANIQUET, of Paris, in the Empire of France, have invented certain new and useful Improvements in Winding, Doubling, Twisting, and Spinning Silk, Cotton, Wool, Flax, Hemps, Cords, and other Filamentous Materials; and I do hereby declare that the following is a full, clear, and exact description of the same, reference being had to the accompanying drawing, making part of this specification, in which similar characters indicate similar parts throughout the figures.

My invention consists, first, in the method of preparing the slivers or strands to be twisted in such manner that they shall receive an equal number of turns through the entire length of the twist, as hereinafter described. Second, in the method of making a continuous regular twist, although the slivers or strands may be irregular, and without destroying the elasticity of the material and without unraveling it, as hereinafter described. Third, in the method of winding and unwinding by means of an annular spindle or its equivalent operating substantially as hereinafter described.

According to the ordinary arrangement of spinning machinery when the wool silk or other fiber that is wound around a bobbin breaks the bobbin continues its rotary motion whereby it not only becomes difficult to connect the two ends of the broken thread, but it is impossible to change the bobbins without considerable loss of time. Now the first part of this invention is intended to remedy this defect.

My invention is intended to produce in single operation the doubling, twisting and spinning of wool silk and other filamentous material. The slivers or threads which constitute the twist receive an equal number of turns which is called the spinning of first twisting. This operation takes place on equal lengths of material between the two points of attachment, one of which is fixed on one side to the spinning spindle and the other to the twisting spindle. The effect of the torsion at the time when the twist commences is to act as a drawing power in proportion to the diameter of the material contained in each of the slivers, and as each sliver diminishes in length and diameter during the operation the strongest become placed in the center, the moderate are rolled around them, and the smallest are rolled around the two others, and to such extent that so soon as one of them varies in diameter it changes immediately in tension and position, and, consequently, the slivers mutually sustain one another in relation to their respective strength, and preserve in the material elasticity and ductility. Supposing that the material doubled on each of the quills or reels be of unequal thickness for a twist of three slivers in the proportion of $\frac{1}{3}$, $\frac{2}{3}$, $\frac{3}{3}$ the twist obtained under these conditions would present a very regular appearance, as the thickest sliver will not project more than the smallest. The twist will preserve its regularity to the traction however strong it may be (up to certain limits) without one of the slivers bulging out to the detriment of the others. If the traction is continued beyond proper limits a break of the parts will take place, but it will be simultaneous at the same point in each sliver as if they had been cut by some sharp instrument.

The principle of my twisting machine is based on the unequal traction of the slivers, which constitute the twist traction, which is in a direct relation to the diameter of each sliver. Thus the particular arrangements of my machine are intended to produce a tension that shall be always equal and especially in proportion to the thickness of the twist in order to obtain in spite of the unequal diameter of each of the fibers a thread or cord of a uniform diameter and capable of offering a perfectly equal resistance. This twisting machine is characterized by the following distinctive features: First, the motion of each arrangement composed of a twisting spindle and of two, three or a greater number of spinning spindles can be stopped instantly when one of the strands breaks without stopping any other parts of the machine. Second, the power of regulating in perfectly equal lengths the distance the strands run before doubling.

The thread passes from a bobbin through a series of guides to a small pulley mounted on a rod, the height of which can be regulated. The threads or strands proceeding from the different bobbins meet at a certain guide where the doubling and twisting take place. One of the bobbins and its spindle move in the same direction but at a different speed. The vertical shaft which carries this bobbin is furnished at its lower part with an endless screw regulated by a clutch arranged on the driving shaft. The said vertical shaft is surrounded by a tube which carries the aforesaid spindle, and which receives motion from another endless screw furnished with a collar fitted to a driving shaft. The threads of the endless screws regulate the motion of the bobbin and of the spindle as desired. The double motion and a different speed are also obtained by differently arranging the endless screws on the vertical shaft and the tube for the twisting spindles. The spindles make from 2,500 to 3,000 turns per minute, while the speed at which the bobbins revolve is somewhat less, according to the degree of torsion desired to be obtained.

The machine is driven by any power imparted to fixed and loose pulleys which are mounted on a shaft carrying wheels and pinions for giving motion to the various moving parts. The partial throwing out of gear can be obtained by either of the two arrangements about to be described. The driving shafts are furnished with collars in two parts in connection with the endless screws; a rod held by the arms of a lever communicates through a cord, chain or band with a hooked lever. When the thread breaks this hooked lever falls on a cam which has a to-and-fro motion imparted to it. A balance lever carries at its upper end three hooks for each arrangement, and at its lower end a single hook, which disengages a spring fixed to a shaft which carries at its extremities two oscillating levers which allow that part of the collar fixed to a groove to slide on the driving shafts which no longer act on the endless screws. By a simple arrangement the parts are brought back to their original position. Stoppage takes place automatically when the threads break, but the parts can be stopped at other times when desired. In the other arrangement for throwing out of gear I dispense with the cam and somewhat modify the other working parts. For spinning or twisting spindles I place the quill or reel immediately above the cap; the former is surmounted by a helical spring, which is held to the point of the spindle by a nut. This nut presses more or less on the cap, according to the nature of the thread to be treated or the speed to be obtained. I also make use of a novel spindle or apparatus for winding and unwinding, suitable for spinning, doubling or twisting, any filamentous material, as more particularly hereafter described.

Figure 8 is an end view partly in section of a twisting machine constructed according to the second part of my invention and Fig. 9 is a side elevation of a portion of the same machine.

According to one arrangement for stopping a spindle when the thread breaks the arm of the lever $a$ being released by the hooked lever $r$ falls and becomes engaged with the needle point $b$ which passes through the shaft $c$ to the rod or lever $d$ as shown clearly in the plan Fig. 10.

$f f$ are toothed wheels which taken into the endless screws $g$ $g'$ placed on shafts one above the other. The endless screws $g'$ are mounted on a rod of the spindle $h$ and drive the bobbins which carry the thread, the other screws $g$ are fitted to a tube $i$ which being mounted on the rod of the spindle $h$, communicates a varying speed but in the same direction to the flier $h'$ mounted on the said spindle. These two motions are intended to deliver the end and relieve its first torsion or spinning before arriving at the twisting spindle. When the needle $b$ changes its position and when it strikes against the rod $d$ it causes the shaft $c$ to revolve slowly. This shaft $c$ (Figs. 10 and 11) is furnished with a gudgeon $j$ (or with any other arrangement by which the catch $k$ can be released) adjusted on a vertical shaft $l$ which is pivoted and is acted on by a helical spring. The shaft $l$ acts on the upper and lower collars $n$ $n'$ of each system through the bars $m$ $m'$ which carry forks between the teeth of which the part marked $n$ of each collar works. The collars are arranged in two parts the part $n$ slides in a groove on the shaft $e$ or $e'$ but cannot revolve without moving with it and is worked by the forks on the bar $m$ or $m'$ a ring $o$ regulating its course. The separation of the two parts $m$ and $n'$ is also regulated by a flange $n^2$ in connection with the part $n'$ and kept at a certain degree of pressure by a screw and supported by two guides or arms held to the part marked $n$. The part $n'$ of the collar is put in motion by a toothed wheel $s$ arranged on the driving shaft $p$ or $p'$, Figs. 8 and 10 and turns loosely when out of gear and allows the shaft $e$ or $e'$ as well as the wheels to stop instantly. The gearing of the different parts is most simple and is effected by drawing the needle $b$ to its first position by attaching the broken thread. The horizontal shaft $c$ worked by means of the rod $q$ draws the gudgeon $j$ or the projection provided in its place in such manner as to force it to act anew on the catch $k'$ while the vertical shaft $l$ being brought back on its axis by means of the rod $q'$ forces that part of the collar marked $n$ to gear progressively and without any shock with the loose part $n'$. The shafts $e$ or $e'$ are by these means put in motion as well as the wheels $f$ and consequently the endless screw $g$ $g'$ of the spindles. In order to reverse the motion of the twisting spindle the endless screws $g$ and $g'$ are arranged in a reverse manner to the endless screws of the spinning spindles as shown in Fig. 9. In order to give during the spinning a regular torsion I place above each spindle a rod or lever $r$ carrying a small pulley which is kept at any desired height by means of a pressure screw. The spun threads meet at a guide above the flier spindle are doubled and receive a twist in the reverse direction.

The machine is driven in the following manner. The two wheels 1 and 2 Fig. 8 rotate in the same direction through the pinion 3; each of these wheels drives in a lateral direction the toothed wheel 4 mounted on the lower driving shaft $p'$, while the upper driving shaft $p$ moves in the same direction by the intermediate wheel 5 gearing with the wheel 6 mounted on the shaft $p$. It is immaterial whether or not the divided collar on the shaft $p$ or $p'$ be removed but if it is the driving wheel $s$ will take into the collar on the shaft $e$ or $e'$.

Figs. 11 and 12 are views of another arrangement of machinery by which the spindle is stopped when a thread breaks. In this case the driving shafts $p$ and $p'$ are dispensed with the shafts $e$ and $e'$ receive the first motion and consequently are the shafts from which the other parts of the machine is at work and carry for each spindle a tube $t$ the ends only of which touch the driving shaft. This tube carries the toothed wheels which act on the endless screws of the spindles. At the time of throwing out of gear the shaft and the part marked $n$ of the collar only move while the part marked $n'$ and the tube stop immediately.

Figs. 13 and 16 show a particular arrangement for mounting the spinning or the twisting spindles. The cap $z$ is placed immediately above the bobbin C which is itself surmounted by a helical spring held on the needle of the spindle by a bolt $y$ which is held as well as the needle by a screw and presses more or less on the cap according to the kind of thread to be treated and the speed to be obtained.

Fig. 14 is a view of another form of spindle suitable for spinning or doubling or twisting any filamentous material. Fig. 15 is another plan. This is an annular arrangement and is characterized by an annular ring $u$ formed with an internal rack. The thread is led through a guide to the center of the ring and surrounds the lower part of the spindle which supports the bobbin C. This part of the spindle is made in the form of an inverted cone, the ring $u$ is reversed at its upper part to adapt itself to the conical form of the spindle while the lower toothed part is in gear with the pinions $v$ and $x$ which allow it to act as an eccentric at the bottom of the bobbin. A small helical spring acts on the pinion $x$ and thus forces the ring to press on the conical part of the spindle.

For stretching or drawing out the threads of cotton or of any material I employ the spindles before described and by this means I obtain a greater regularity through the whole length of thread.

The filamentous material delivered by the rollers 7 and 8 is stretched by the cylinders 9 and 10 and finally arrives at the bobbin C. When a sliver is too large the rollers 9 and 10 prevent its too speedy deliverance and the spindle not decreasing its speed draws out the thread and reduces it to the required thickness.

I claim—

1. The method of making a continuous regular twist, although the slivers or strands may be irregular and without destroying the elasticity of the material, and without unraveling it, as hereinbefore described.

2. The method of winding and unwinding by means of an annular spindle or its equivalent operating substantially as herein described.

In testimony whereof I have signed my name to this specification before two subscribing witnesses.

J. A. DE MANIQUET.

Witnesses:
 GEO. W. HUTTON,
 S. CLAËS.